(12) United States Patent
Iyer et al.

(10) Patent No.: US 7,525,943 B2
(45) Date of Patent: Apr. 28, 2009

(54) RECONFIGURABLE ACCESS POINT

(75) Inventors: Pradeep J. Iyer, Cupertino, CA (US);
Partha Narasimhan, Santa Clara, CA (US); Keerti G. Melkote, San Jose, CA (US); John Taylor, Tiburon, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 333 days.

(21) Appl. No.: 11/098,903

(22) Filed: Apr. 4, 2005

(65) Prior Publication Data
US 2005/0207448 A1    Sep. 22, 2005

Related U.S. Application Data (63) Continuation-in-part of application No. 10/237,315, filed on Sep. 9, 2002, now Pat. No. 7,414,995.

(51) Int. Cl.
H04B 7/212    (2006.01)
(52) U.S. Cl. .................. 370/338; 370/328; 370/400; 370/463; 455/411; 455/574; 709/237
(58) Field of Classification Search .......... 370/476, 370/229, 248, 328, 331, 338, 349, 389, 351, 370/400, 449, 463, 466, 474, 329; 455/411, 455/574; 709/224, 230, 237, 238
See application file for complete search history.

(56) References Cited

U.S. PATENT DOCUMENTS

| 5,095,480 | A | * | 3/1992 | Fenner ..................... 370/238 |
| 5,355,520 | A | | 10/1994 | Freeburg et al. |
| 5,623,495 | A | | 4/1997 | Eng et al. |
| 5,664,765 | A | | 9/1997 | Pickrell |
| 5,917,900 | A | | 6/1999 | Allison et al. |
| 6,067,297 | A | * | 5/2000 | Beach ....................... 370/389 |
| 6,104,928 | A | | 8/2000 | Waugh |
| 6,167,062 | A | * | 12/2000 | Hershey et al. ............ 370/503 |
| 6,405,058 | B2 | | 6/2002 | Bobier |
| 6,421,714 | B1 | | 7/2002 | Rai et al. |
| 6,539,207 | B1 | | 3/2003 | Del Castillo et al. |
| 6,600,734 | B1 | * | 7/2003 | Gernert et al. ............ 370/352 |
| 6,721,805 | B1 | | 4/2004 | Bhagwat et al. |
| 6,768,721 | B1 | * | 7/2004 | Schmitz et al. ............ 370/248 |
| 7,146,433 | B2 | * | 12/2006 | Cromer et al. ............ 709/239 |

(Continued)

OTHER PUBLICATIONS

United States Office Action dated Sep. 27, 2007 for U.S. Appl. No. 10/237,315, filed Sep. 9, 2002 entitled A Modular Radio Access Point.

(Continued)

*Primary Examiner*—Matthew D Anderson
*Assistant Examiner*—Shaima Q Aminzay
(74) *Attorney, Agent, or Firm*—Blakely, Sokoloff, Taylor & Zafman LLP (57) ABSTRACT

In general, one embodiment of the invention relates to a method of operation where the type of an incoming Media Access Control (MAC) frame is initially determined. Based on such determination, the MAC frame is processed locally at an access point if the MAC frame is one of a first group of MAC frames. Otherwise, the MAC frame is processed remotely at a switch communicatively coupled to the access point.

22 Claims, 6 Drawing Sheets

U.S. PATENT DOCUMENTS

| | | | |
|---|---|---|---|
| 7,149,196 B1* | 12/2006 | Bims | 370/328 |
| 2002/0133528 A1 | 9/2002 | Zolti et al. | |
| 2003/0002467 A1 | 1/2003 | Leung | |
| 2003/0026198 A1* | 2/2003 | Diepstraten et al. | 370/208 |
| 2004/0022222 A1* | 2/2004 | Clisham | 370/338 |
| 2004/0032871 A1* | 2/2004 | Sharon et al. | 370/400 |
| 2005/0185632 A1* | 8/2005 | Draves et al. | 370/351 |

OTHER PUBLICATIONS

United States Office Action dated Jul. 2, 2007 for U.S. Appl. No. 10/237,315, filed Sep. 9, 2002 entitled a Modular Radio Access Point.

United States Office Action dated Jan. 12, 2007 for U.S. Appl. No. 10/237,315, filed Sep. 9, 2002 entitled A Modular Radio Access Point.

* cited by examiner

| FRAME | MAC PROCESSING (SAP) | MAC PROCESSING (WSS) |
|---|---|---|
| 402 — RTS | X | |
| 402 — CTS | X | |
| 402 — ACK | X | |
| 408 — CF END | X | |
| 410 — CF END + CF ACK | X | |
| 412 — DATA | | X |
| 414 — DATA + CF ACK | X | |
| 416 — DATA +CF POLL | X | |
| 418 — DATA + CF ACK + CF POLL | X | |
| 420 — CF ACK | X | |
| 422 — CF POLL | X | |
| 424 — CF ACK + CF POLL | X | |
| 426 — NULL FUNCTION | X | |
| 428 — BEACON | X | |
| 430 — PROBE REQUEST | | X |
| 432 — PROBE RESPONSE | | X |
| 434 — ASSOCIATION REQUEST | | X |
| 436 — ASSOCIATION RESPONSE | | X |
| 438 — REASSOCIATION REQUEST | | X |
| 440 — REASSOCATION RESPONSE | | X |
| 442 — DISASSOCIATION | | X |
| 444 — AUTHENTICATION | | X |
| 446 — DEAUTHENTICATION | | X |
| 448 — PS-POLL | X | |
| 450 — ENCRYPTION (WEP/AES) | | X |
| 452 — TIM CALCULATION | X | |
| 454 — FRAGMENTATION/DEFRAGMENTATION | | X |
| 454 — 802.11 <-> 802.3 BRIDGING | | X |
| 458 — DATA BUFFERING FOR POWER SAVE | X | |

RECONFIGURABLE ACCESS POINT

CROSS-REFERENCES TO RELATED APPLICATIONS

This application is a continuation-in-part application of U.S. patent application Ser. No. 10/237,315 filed Sep. 9, 2002.

FIELD

Embodiments of the invention relate to the field of wireless communications, in particular, to a wireless local area network (WLAN) device.

GENERAL BACKGROUND

Over the last decade or so, for most businesses, it has become a necessity for employees to share data over local area networks. To improve efficiency, enhancements have added to a local area network such as remote wireless access. This enhancement provides an important extension in forming a wireless local area network (WLAN).

Typically, a WLAN features a wireless network interface card and a wireless access point (AP). The network interface card enables one or more wireless devices, such as a laptop computer or personal digital assistant, to communicate with the AP over the air. The AP operates as a relay station by receiving data frames from the network interface card and transmitting data from these frames to a fixed, backbone network. Thus, the AP supports communications with both a wireless network and a wired network.

Over the past few years, a number of WLAN standards have been developed. For instance, the revised 802.11 standard "Wireless LAN Medium Access Control (MAC) and Physical Layer (PHY) specifications" (IEEE 802.11, 1999) has been widely deployed. However, new features are continuously being developed to enhance the functionality of WLANs. For instance, WLANs are consistently being deployed with improved cryptographic functions and authentication protocols.

One problem associated with conventional APs is that such equipment is designed to support specific, existing wireless network standards. If a new feature or improvement is developed for the WLAN standard and support for this feature/improvement is desired, a new set of APs supporting the new WLAN standard must be deployed. This can be accomplished by deploying new APs operating in parallel with old APs or replacing the old APs with newer APs supporting both old and new WLAN standards. In either case, support for any new WLAN standard requires deployment of a whole new array of APs, which is quite costly and difficult to manage.

Another problem is that APs are generally installed in the plenium. In other words, network-forwarding intelligence is positioned outside the wiring closet. Hence, for many installations, APs are too troublesome to replace in order to reconfigure the network with minor, but useful, changes in the WLAN standard.

SUMMARY

According to one embodiment of the invention, a method for separating the functionality in responding to wireless communications comprises an act of determining which type of incoming Media Access Control (MAC) frame has been received. Thereafter, the MAC frame is processed locally at the access point if the MAC frame is one of a first group of MAC frames as detected when the type of MAC frame is determined. Otherwise, the MAC frame is processed remotely at the switch communicatively coupled to the access point.

BRIEF DESCRIPTION OF THE DRAWINGS

The invention may best be understood by referring to the following description and accompanying drawings that are used to illustrate embodiments of the invention.

DETAILED DESCRIPTION

Herein, certain embodiments of the invention relate to split functionality Access Point (referred to as a "Split AP") and a method of communicating between components of the Split AP. Normally, a Split AP is deployed within a wireless network such as a wireless local area network (WLAN). The WLAN may be configured in accordance with Institute of Electrical and Electronics Engineers (IEEE) 802.11, as well as different types of High Performance Radio Local Area Networks (HiperLAN) or subsequently published specifications.

Certain details are set forth below in order to provide a thorough understanding of various embodiments of the invention, albeit the invention may be practiced through many embodiments other that those illustrated. Well-known components and operations are not set forth in detail in order to avoid unnecessarily obscuring this description.

In the following description, certain terminology is used to describe features of the invention. For example, a "component" may include hardware and/or software modules that perform one or more operations on incoming information. A "software module" is executable code such as an operating system, an application, an applet or even a routine. The software module may be stored in any appropriate storage medium such as a programmable electronic circuit, a semiconductor memory device, a volatile memory (e.g., random access memory, etc.), a non-volatile memory (e.g., read-only memory, flash memory, a hard drive disk, etc.), or portable memory (e.g., floppy diskette, an optical disk such as a CD or DVD, a tape, or a Universal Serial Bus "USB" flash drive), or the like.

An "interconnect" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology).

"Information" is defined as data, address, control or any combination thereof. For transmission, information is transmitted as a frame being a series of bits such as a single packet or a series of packets, where each packet features a predetermined number of bits of information.

Figures 1, 4:
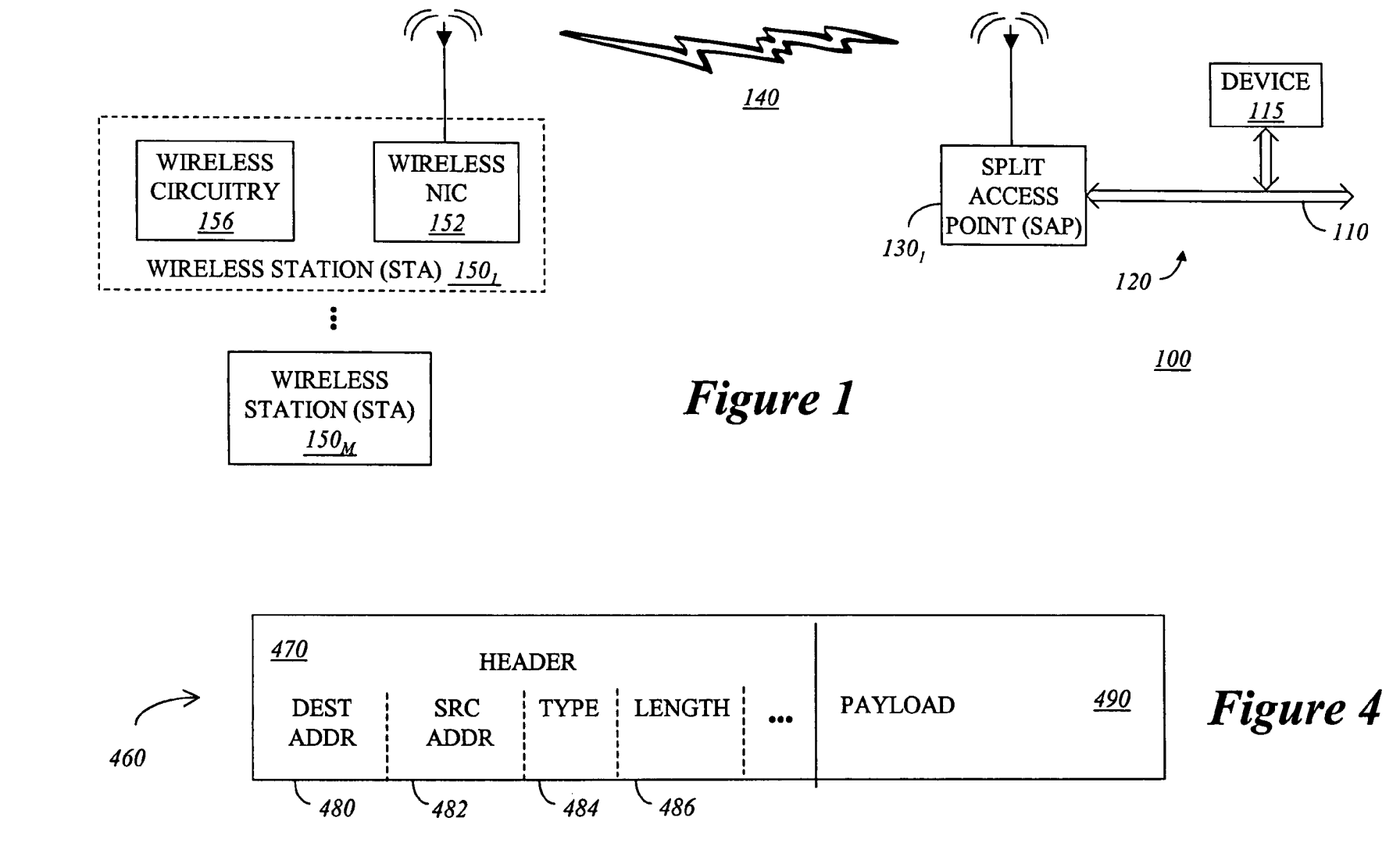
FIG. 1 is an exemplary embodiment of a wireless local area network including an Access Point employing the present invention.
FIG. 4 is an exemplary embodiment of a communication protocol between the SAP system and component of a wireless services switch of FIG. 2.

Referring to FIG. 1, an exemplary embodiment of a wireless network (WLAN) 100 in accordance with the invention is illustrated. The WLAN 100 comprises an interconnect 110 being a physical medium that forms part of a wired network 120. The wired network 120 provides resources available for users of the network 100. Such resources may include data stored on a device 115 coupled to the interconnect 110.

The interconnect 110 is further coupled to one or more (N) Split Access Points (SAPs) $130_1$-$130_N$ that communicate over the air 140 with one or more (M) wireless stations (STAs) $150_1$-$150_M$. For illustrative purposes, Split AP $130_1$ and one STA $150_1$ are shown in communication, although other communication schemes may be realized.

The STA $150_1$ includes a removable, wireless network interconnect card (NIC) 152 that is separate from or employed within wireless circuitry 156 that processes information (e.g., computer, personal digital assistant "PDA", telephone, alphanumeric pager, etc.). Normally, the NIC 152 operates as a wireless transceiver, but may be configured to operate with only transmit or receive functionality.

The STA $150_1$ communicates with and accesses information from Split AP $130_1$ over the air 140 in accordance with IEEE 802.11 communications protocol or with another WLAN standard protocol including any type of HiperLAN protocol. Hence, the Split AP $130_1$ generally operates as a transparent bridge connecting both a wireless network featuring the STA $150_1$ with the wired network 120.

The Split AP $130_1$ is an electronic device that provides bi-directional communications between one or more STAs $150_1$-$150_M$ and a network such as the wired network 120. Split AP $130_1$ is communicatively coupled to the wired network 120 over an interconnect, which may be a physical medium (as shown) or a wireless medium. The wired network 120 can be of any type of wired network, including but not limited or restricted to Ethernet, Token Ring, Asynchronous Transfer Mode (ATM) or the like.

Figure 2:
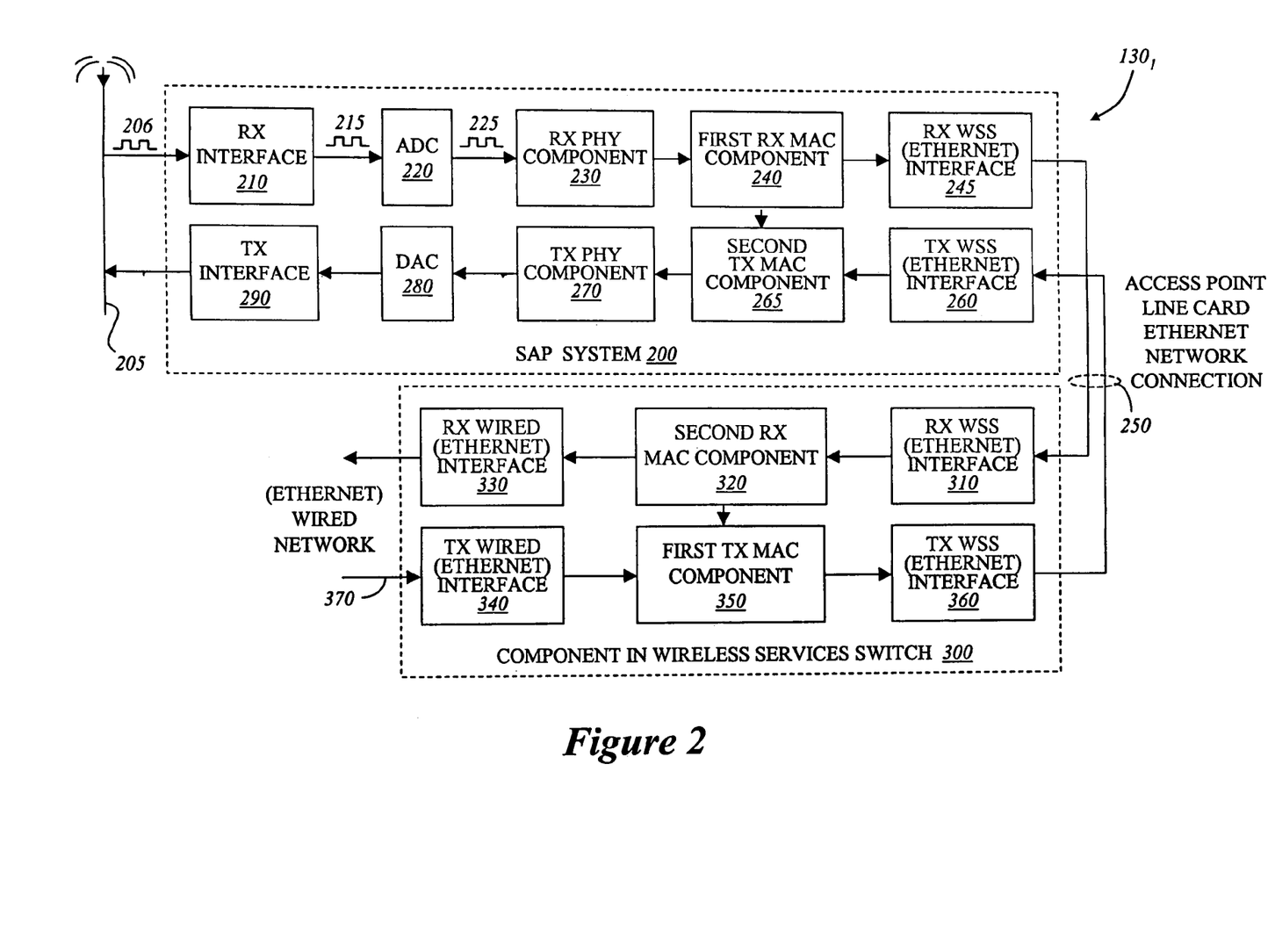
FIG. 2 is an exemplary embodiment of the Access Point (AP) of FIG. 1.

Referring now to FIG. 2, an exemplary embodiment of the Split AP $130_1$ is shown. The Split AP $130_1$ comprises a softAP (SAP) system 200 and a programmable and/or removable component 300 being part of a switch (referred to as a "wireless services switch" or "WSS"). This separation of components sensitive to wireless transmission/reception (remaining in SAP system 200) and components partially involved with Media Access Control (MAC) processing (moved to WSS component 300) enables cost effective updating of the AP $130_1$, namely SAP system 200, without removal of components 300.

In one embodiment, the "WSS" is an Ethernet switch that can support the implementation of one or more components, one or more of which can be placed on removable line cards. In general, components provide different data processing capabilities as well as modulation and/or demodulation schemes. This modular line card design provides a modular implementation that can be used for client customization.

As shown, the component 300 features Split Media Access Control (MAC) components 320 and 350, operating in accordance with selected WLAN standards, which are placed in a wireless services switch in lieu of their standard placement within the conventional AP itself. This provides for cost-effective upgrades. For instance, the component 300 may be adapted as a removable line card, which can be removed and replaced with a card having MAC components supporting new WLAN standards. In another embodiment, where MAC processing of the component 300 is performed by software, such software may be re-programmed through a variety of techniques, including transmission of control frames over the air, direct download through a port of the switch, or even removal and reprogramming of Flash memory or another type of programmable read only memory (e.g., PROM, EPROM, EEPROM, etc.).

More specifically, as shown in FIG. 2, on the receive (RX) side, the SAP system 200 comprises a RX interface 210, an analog-to-digital converter (ADC) 220, a RX Physical (PHY) component 230, a first RX Split MAC (MAC) component 240 and a WSS interface component 245.

For one embodiment of the invention supporting 802.11 communication standards, an antenna 205 receives an incoming data stream 206. The data stream 206 includes IEEE 802.11 MAC frames encoded and carried within a frequency channel that is located within a carrier frequency band. The carrier frequency band is located within typical radio frequency (RF) band of frequencies. For example, the RF band may generally fall within an approximate range of 2.4-2.5 GHz or perhaps an approximate range of 5-5.25 GHz. It is contemplated, though, that the invention may be applied to any frequency range.

The RX interface 210 is configured to isolate the frequency channel on which data is carried from all the other frequencies received on the antenna 205. This may be accomplished through a tunable filter tuned to a center frequency of a channel of interest. The data channel undergoes a frequency shifting from the carrier band to baseband and a resulting analog radio signal 215 is routed to the ADC 220.

The ADC 220 samples baseband analog radio signal 215 and converts it into a series of digital values 225. The digital values 225 are provided to RX PHY component 230, which is responsible for notifying a corresponding RX Split MAC component 320 of received signal activity and configuring the received digital values 225 into a format recognizable by the first RX Split MAC component 240.

In particular, according to one embodiment of the invention, the RX PHY component 230 is a software module executed by a programmable processor, such as a digital signal processor for example, to demodulate the digitally sampled baseband signal (e.g., digital values 225) to recover MAC frames. Typically, a fixed number of demodulation protocols are stored and supported by the RX PHY component 230. For instance, the AP $130_1$ may support both 802.11a and 802.11b demodulation protocols as well as other protocol types. This differs from conventional APs supporting one demodulation protocol.

The first RX Split MAC component 240 analyzes the type and subtype of the recovered IEEE 802.11 MAC frame to determine whether return communications should be handled by SAP system 200 or component 300.

The IEEE 802.11 standard defines two forms of media access; namely, distributed coordination function (DCF) and point coordination function (PCF). DCF is based on the CSMA/CA (carrier sense multiple access with collision avoidance) protocol. With DCF, the STAs contend for access and attempt to send frames when there is no other STAs transmitting. If another STA is sending a frame, the other STAs wait until the channel is available. Examples of various types of DCF-based frames include data frames as well as various control frame subtypes such as Return-to-Send (RTS), Clear-to-Send (CTS) and Acknowledge (ACK), which are handled by first RX Split MAC component 240 as shown in FIG. 3.

For supporting time-bounded delivery of data frames, the IEEE 802.11 standard defines the optional point coordination function (PCF), where the AP grants network access to an individual STA by polling the STA during the "contention free" (CF) period. STAs cannot transmit frames unless the AP polls them first. The period of time for PCF-based data traffic (if enabled) occurs alternately between CF periods.

According to one embodiment of the invention, for these types of media access, only the DCF-based "Data" frames are handled by a second RX Split MAC component 320. Other data frame subtypes are handled by the first RX Split MAC component 240 of FIG. 2.

Figure 3:
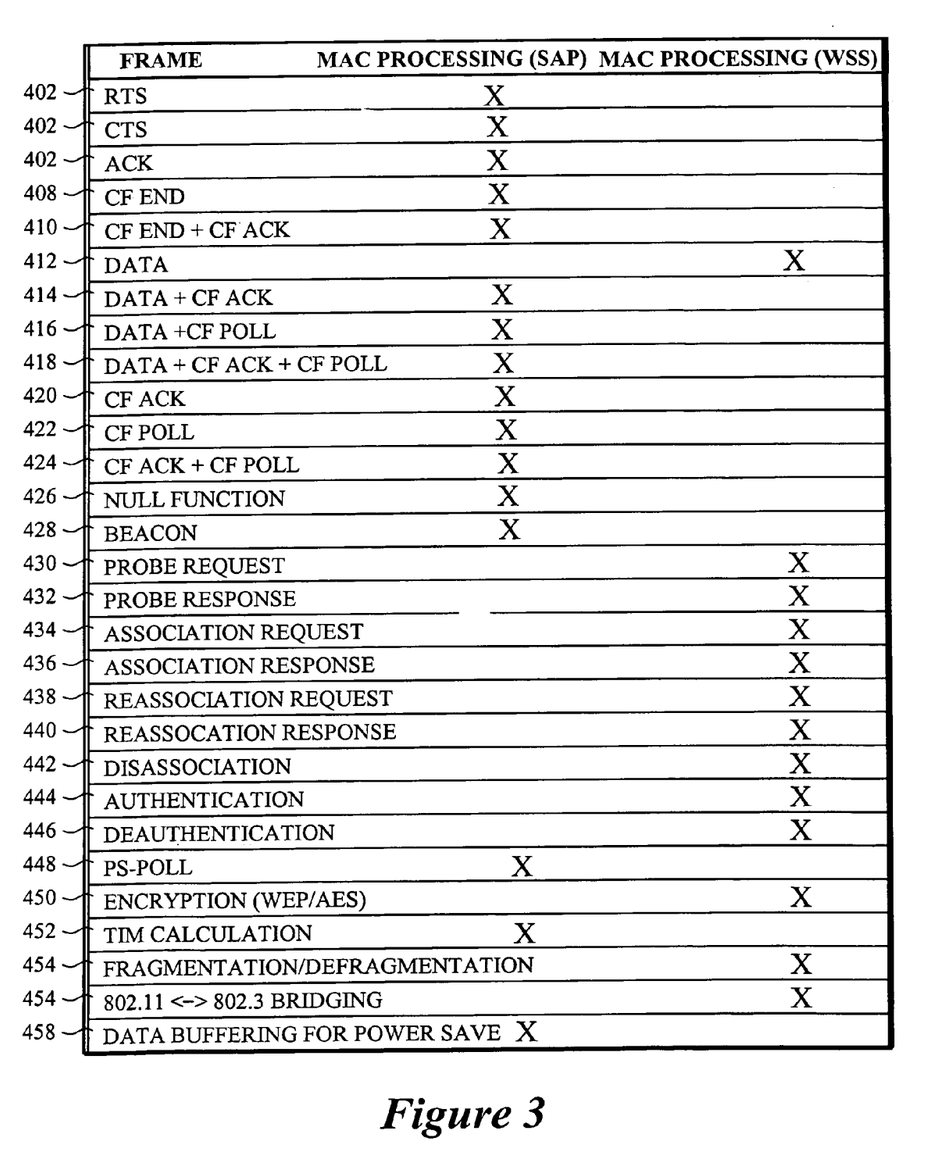
FIG. 3 is an exemplary table illustrating the frame subtypes supported by the combined functionality of the soft Access Point (SAP) system and a component of a wireless services switch forming the AP of FIG. 2.

In general, as listed in an exemplary table of FIG. 3, the SAP system 200 and component 300 of FIG. 2 separately handle various functional operations. As illustrated in the table, SAP system 200 of FIG. 2 handles the MAC processing of frames that require extremely fast turnaround response time. In contrast, the component 300 of FIG. 2 handles the MAC processing for frames that normally have no or flexible response time constraints, or require substantial state information storage for processing.

More specifically, according to one embodiment of the invention as shown in FIG. 3, "Data" subtype frames 412 are handled by the second RX Split MAC component 320. The first RX Split MAC component 240 handles the remaining data and control subtypes 402-410 and 414-426 for DCF and PCF-based communications. Examples of various types of DCF & PCF-based frames may include various control frame subtypes such as "RTS" 402, "CTS" 404, "Acknowledge" (ACK) 406, "CF End" 408 (to conclude end of CF period) and "CF End+ACK" 410 (combination of CF End and ACK subtype frames). Other PCF-based data frame subtypes may include "CF ACK" 420, "CF Poll" 422, "CF ACK+CF Poll" 424 (combination of CF ACK and CF Poll subtype frames), and "Null" 426 (carry power management bit), "Data+CF ACK" 414 (combination of Data and CF ACK frames), "Data+CF Poll" 416 (combination of Data and CF Poll subtypes) and "Data+CF ACK+CF Poll" 418 (combination of Data, CF ACK and CF Poll subtypes).

In addition, the SAP system 200 is responsible for handling the operations conducted for certain power management frames such as "PS-Poll" (request to an AP to deliver a buffered frame) 448, "Traffic Indication Map" (TIM) calculation 452, and "data buffering for power save" 458. These power management frames are handled by SAP system 200 due to their time-dependent response time and the requirement of only a minimal amount of state information to support the response.

Referring back to FIG. 2, the incoming MAC frame is transferred between the SAP system 200 and component 300 over the WSS interconnect 250, which provides coupling between complementary WSS (Ethernet) interface components 245 and 310. In one embodiment, WSS interface component 310 may be configured as an Ethernet connector for a removable line card adapted for coupling to the complementary WSS interface component 245. The framing of the WSS frame is described in FIG. 4.

The SAP system architecture supports future WLAN standards by antenna 205 and RX interface 210, being configured to simultaneously receive and transmit all of the carrier bands that may be used for wireless networking. Moreover, radio signals from all of the desired carrier bands are sampled by ADC 220 in parallel, thereby ADC 220 may have more than one ADC component.

Referring now to FIG. 4, an exemplary embodiment of the operations of an identification protocol for framing the digitally sampled values 225 into a format for transmission over WSS interconnect 250 is shown. In general, one purpose of the identification protocol is to tunnel IEEE 802.11 traffic with a specified encapsulation over WSS interconnect 250. GRE encapsulation is just one example of encapsulation that can be used. Other types of encapsulation include, but are not limited or restricted to L2 encapsulation, UDP encapsulation, GRE encapsulation, IPSec encapsulation, and the like.

For this embodiment, one or more WSS frames are exchanged between the SAP system 200 and the component 300. Each WSS frame 460 comprises a header 470 and a payload 490. Payload 490 includes data being transmitted. In one embodiment, payload 490 carries the actual, recovered IEEE 802.11 MAC frame.

Header 470 may comprise various elements, depending on the type of encapsulation deployed. As an example, for L2, GRE, UDP or even IPsec encapsulation, the header 470 would at least comprise a destination address 480 of the RX WSS interface 310, a source address 482 of RX WSS interface 245, a Type 484 (e.g., Ethernet, IP) field, header length field 486, and the like.

Hence, in the receive (RX) direction, this information is used to properly demodulate the radio signal and recover a data stream. In the transmit (TX) direction, however, this information is used by the SAP system 200 to create the radio signal from the data stream.

Referring back to FIGS. 2 and 3, the component 300 comprises the WSS interface component 310, the second RX Split MAC component 320, and a RX wired network interface 330. As referenced, the WSS interface component 310 recovers the MAC frame from the WSS frame transferred over the interconnect 250.

The second RX Split MAC component 320 implements the receive portion of access control functions provided by the MAC frames, which are necessary for negotiating access to a shared wireless transmission media (e.g. air). The second RX Split MAC component 320 is configured to perform a number of operations to provide reliable delivery of information, some of which may include, for example, (i) analysis of the integrity of received MAC frames, (ii) handling of timing, priority and fragmentation as well as (iii) determination whether the MAC frame is encrypted. In addition, the second RX Split MAC component 320 also produces a data stream without any 802.11 protocol content. The second RX Split MAC component 320 supports multiple WLAN standards such as both IEEE 802.11a, IEEE 802.11b and can support additional or future WLAN standards due to its programmability.

For supporting time-bounded delivery of data frames, the 802.11 standard defines the optional point coordination function (PCF) where the AP grants network access to an individual STA by polling the STA during the "contention free" (CF) period. STAs cannot transmit frames unless the AP polls them first. The period of time for PCF-based data traffic (if enabled) occurs alternately between CF periods.

According to one embodiment of the invention, the functionality for processing "Data" frames is handled by the second RX Split MAC component 320 in lieu of first RX Split MAC component 240. In addition, most management frame subtypes, excluding beacons 428, are handled by the second RX Split MAC component 320 as shown in FIG. 3. Examples of various types of DCF & PCF-based management frame subtypes may include Probe Request 430, Probe Response 432, Association Request 434, Association Response 436, Reassociation Request 438, Reassociation Response 440, Disassociation 442, Authentication 444 and Deauthentication 446.

Moreover, encryption (WEP/TKIP/AES) 450, fragmentation/reassembly 454 and bridging operations 456 are also managed by second RX Split MAC component 320.

For this embodiment of the invention, the RX wired network interface 330 contains transmit MAC and PHY layer functions for the communication protocol supported for the wired network 120. In particular, for this embodiment of the invention, the RX wired network interface 330 is responsible for framing the data stream with 10/100/1000 Ethernet protocol and transmitting the resulting frames to the wired network 120.

Referring still to FIG. 2, on the transmit (TX) side, component 300 further comprises a TX wired network interface 340, a first TX Split MAC component 350, and TX WSS interface component 360.

For this embodiment of the invention, TX wired network interface 340 contains receive MAC and PHY layer functions to receive and process Ethernet MAC frames 370 routed from wired network 120. The first TX Split MAC component 350 implements the transmit portion of the access control functions, which are necessary for negotiating access to a shared wireless transmission media (e.g. air). This component converts MAC frames configured according to a wired protocol to MAC frames in accordance with a WLAN protocol (e.g., IEEE 802.11a, IEEE 802.11b or any future WLAN standard).

TX WSS interface component 360 is configured to encapsulate received IEEE 802.11 MAC frames for transmission over WSS interconnect 250 as described above.

In general, data routed to the First Tx Split MAC component 350 on the switch is an Ethernet (IEEE 802.3) frame. The first TX Split MAC component 350 will convert the Ethernet frame into an IEEE 802.11 frame (translational bridging), optionally encrypt the resulting frame, encapsulate the resulting frame with the right protocol (Ethernet, IP GRE, IP UDP, IPSec) and send the resulting frame to the Second TX Split MAC component 265.

As further shown in FIG. 2, SAP system 200 also comprises a complementary WSS interface component 260, a second TX Split MAC component 265, a TX PHY component 270, a digital-to-analog converter (DAC) 280 and a TX interface 290.

According to one embodiment of the invention, WSS interface component 260 recovers the transmitted MAC frame(s). TX Split MAC component 265 performs functionality as illustrative in FIG. 3, where TX PHY component 270 modulates the WLAN-based MAC frame to create a digital baseband radio signal. Typically, a fixed number of modulation protocols are stored and supported by TX PHY component 270. For instance, AP $130_1$ may support both 802.11a and 802.1b modulation protocols as well as other modulations.

DAC 280 converts the digital baseband radio signal into an analog baseband radio signal 285 that is routed to TX interface 290. The TX interface 290 is responsible for taking analog baseband radio signal 285 from DAC 280 and shifting its frequency to place it in an appropriate channel within the carrier band.

As described, AP $130_1$ can be designed to be very flexible in terms of the number and location of the frequency channels, which are received and transmitted. Multiple channels within the same band can be accessed. An example of this configuration is where SAP system 200, which can access multiple channels within the 2.4 GHz band simultaneously for an 802.11b application. Another possibility is for individual channels within different bands accessed at the same time. An example of this configuration is an AP, which can access one channel within the 2.4 GHz band and one within the 5 GHz band simultaneously for an 802.11a+b application.

Each channel captured represents a sample stream which should be carried over WSS interconnect 250 so the bit rate of the interface increases as more channels are captured. The maximum traffic is limited by IEEE 802.11a/g speeds, where 54 Mbps per radio on the PHY, and normally does not exceed 40 Mbps.

Figure 5:
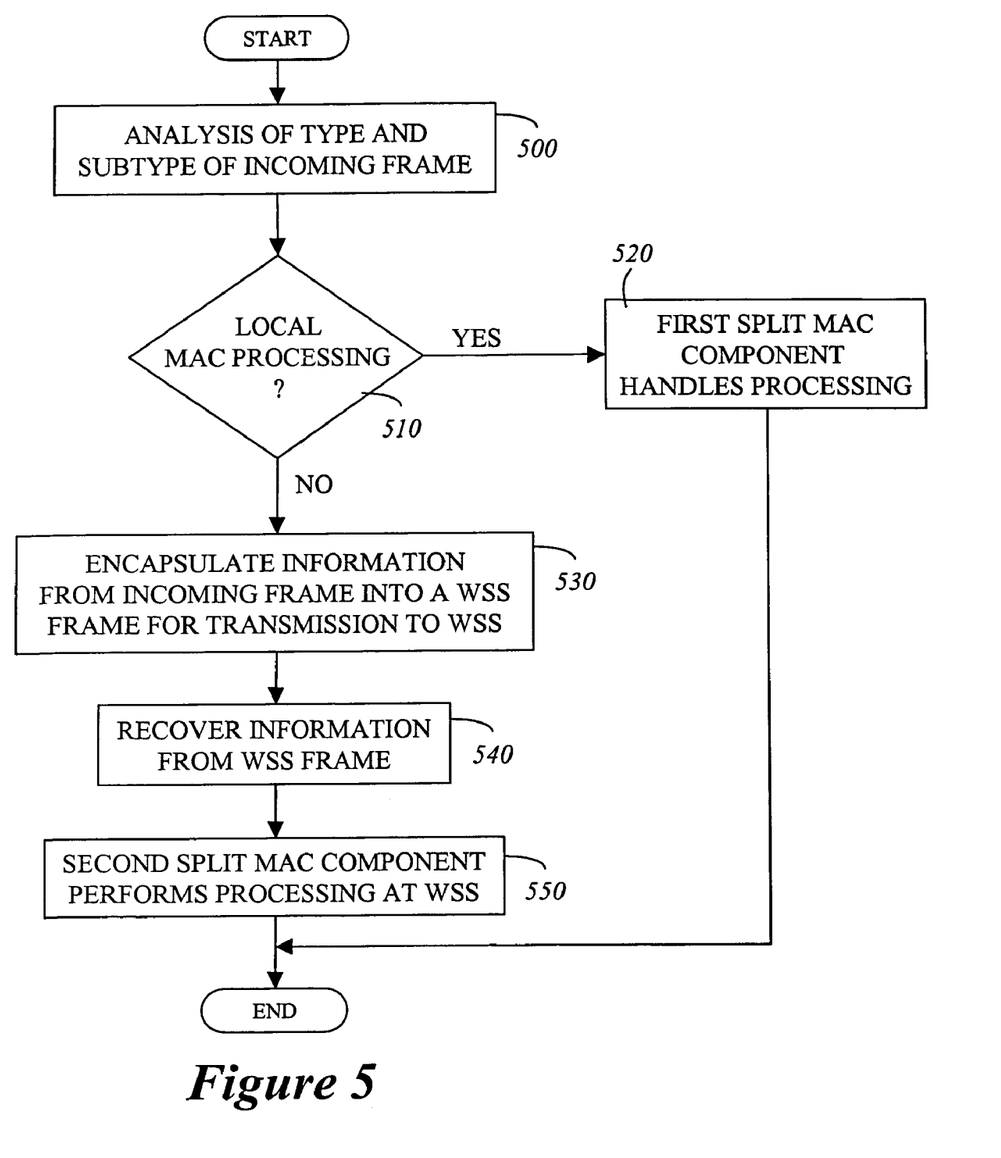
FIG. 5 is an exemplary embodiment of communications between the SAP system and the switch component of FIG. 2.

Referring now to FIG. 5, an exemplary embodiment of a flowchart identifying the communications between the SAP system 200 and the component 300 of FIG. 2 is shown. Upon receipt of a wireless frame, the Split AP analyzes the type and subtype fields of the frame (block 500). Based on such an analysis, a determination is made whether MAC processing of the frame should be conducted locally (block 510). If so, SAP system handles the MAC processing (block 520).

However, if the MAC processing of the frame is determined to be conducted remotely, certain information for the frame is encapsulated and transmitted in a predetermined frame format (WSS frame) over an interconnect, which establishes a communication path between the SAP system and the component of the wireless services switch (block 530). Upon receipt, the information is extracted and undergoes MAC processing by the WSS (blocks 540 and 550).

Figure 6A:
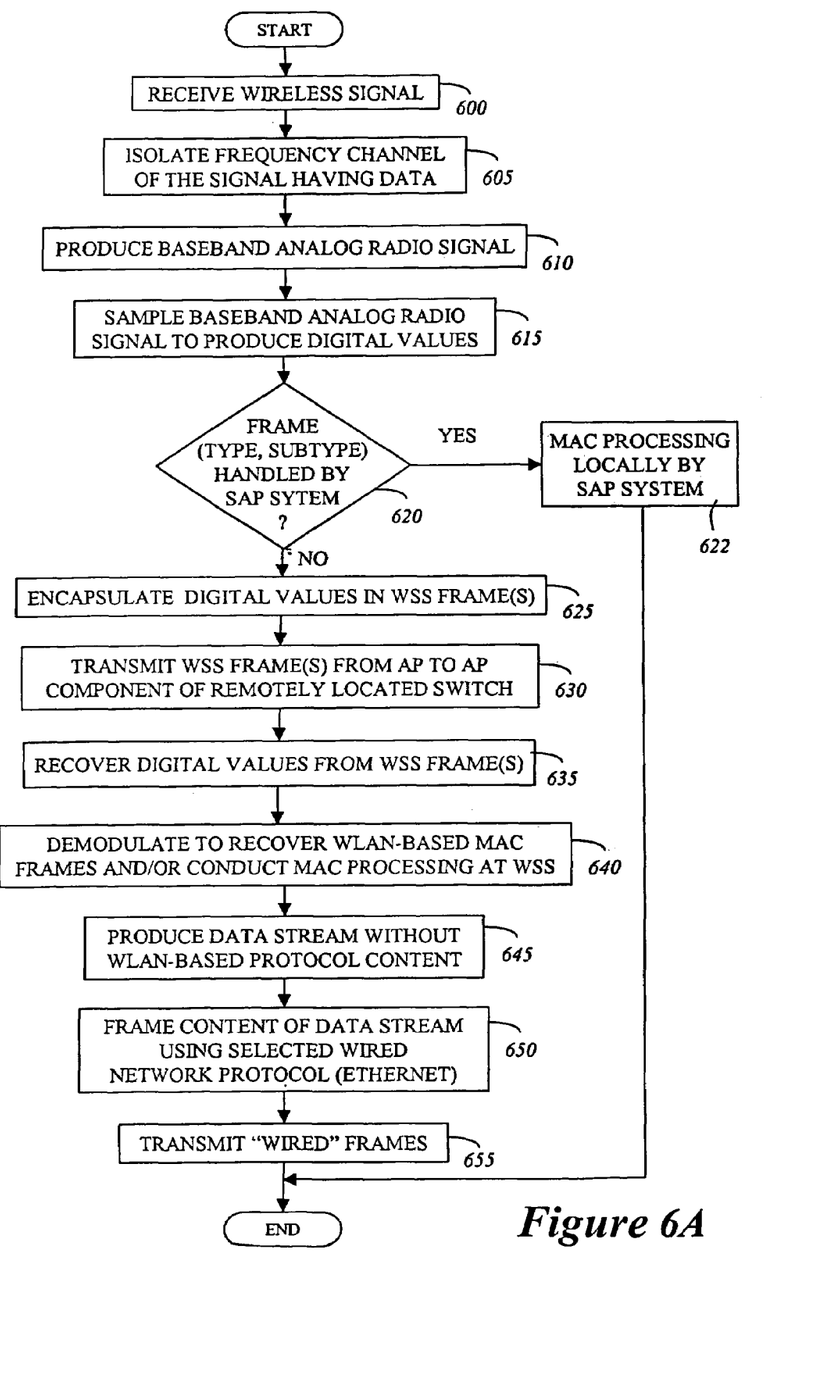
FIGS. 6A & 6B are detailed exemplary embodiments of a flowchart identifying the communications between the SAP system and the switch component of FIG. 2.
Figure 6B:
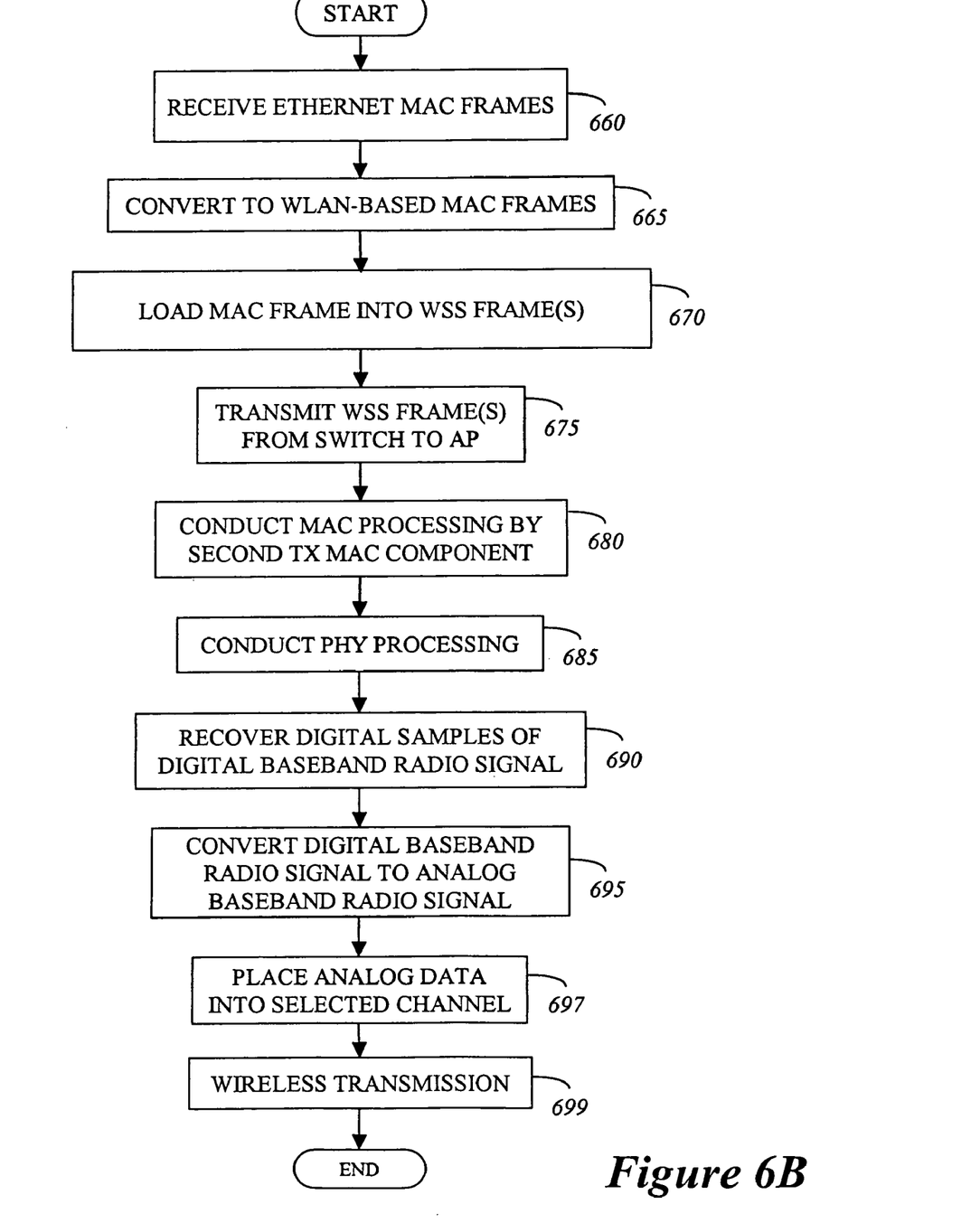

Referring now to FIGS. 6A and 6B, exemplary embodiments of a flowchart identifying the communications between the SAP system 200 and the component 300 of FIG. 2 is shown.

As shown in FIG. 6A, in response to receipt of a wireless signal by the SAP system, the frequency channel on which data is carried is isolated from all the other frequencies received on the antenna (blocks 600 & 605). This channel undergoes a frequency adjustment from the carrier band to a baseband, which produce a baseband analog radio signal (block 610).

The baseband analog radio signal is sampled to recover the MAC frame (block 615). The type and subtype of the incoming MAC frame is determined whether it is a particular management or data frame subtype, and if so, it is handled locally by the first RX Split MAC component (blocks 620 and 622). Otherwise, it is determined to be handled remotely by second RX Split MAC component so that the MAC frame is encapsulated for transmission over the WSS interconnect (blocks 625 and 630). For example, a header of the WSS frame may include routing information while the payload includes the MAC frame.

As the frame is received by the component at WSS, the MAC frame is removed from the WSS frame (block 635). Thereafter, the digitally sampled baseband signal (digital values) are processed by the second RX Split MAC component and/or demodulated to recover MAC frames already processed by the first RX Split MAC component (block 640). Information within portions of these MAC frames is used to negotiate access to a shared wireless transmission media (e.g. air) and to produce a data stream without any 802.11 or WLAN-based protocol content (block 645).

Finally, a RX wired network interface frames the data stream in accordance with a selected network protocol (e.g., Ethernet) and transmits the resulting frames into the wired network 120 of FIG. 1 (blocks 650 and 655)

Referring to FIG. 6B, in response to receiving frames (e.g., Ethernet MAC frames) over wired network for wireless transmission, these Ethernet MAC frames are converted to WLAN-based MAC frames, especially for management frames as well as the Data frame (blocks 660 and 665). In general, such conversion may include the addition of an AP address field and a network address field to headers of the Ethernet MAC frames.

Herein, one or more WLAN-based MAC frames are loaded into one or more WSS frames for transmission from the switch to the SAP system across the WSS interconnect (blocks 670 and 675). PHY and MAC processing are conducted as needed (blocks 680 and 685). Thereafter, the digital baseband radio signal is recovered prior to conversion and production of an analog baseband radio signal (blocks 690 and 695). The analog baseband radio signal is adapted to place such data in an appropriate channel with the carrier band (block 697). The signal is then transmitted throughout the air (block 699).

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A system, comprising:
   an interconnect;
   a device coupled to a first end of the interconnect, the device including at least one component to recover information from an incoming wireless signal and to determine whether the information is processed at the device, the at least one component includes a first media access control (MAC) component to analyze the information by analyzing a type field of a first MAC frame to determine (i) whether return communications in response to the incoming wireless signal are to be handled by the device or (ii) whether return communications in response to the incoming wireless signal are to be handled by a switch; and
   the switch coupled to a second end of the interconnect and remotely located from the device, the switch including at least one component to recover the information and subsequently process the information for transmission over a wired network.

2. The system of claim 1, wherein the device is an access point.

3. The system of claim 2, wherein the first MAC component is to perform MAC processing of the information at the device when the first MAC component determines that the return communications in response to the incoming wireless signal are to be handled by the device and the switch is to perform MAC processing of the information in lieu of the first MAC component when the first MAC component determines that the return communications in response to the incoming wireless signal are to be handled by the switch.

4. The system of claim 1, wherein the first MAC component to further analyze a subtype field of the first MAC frame in order to determine whether processing is handled at the device or at the switch.

5. The system of claim 4, wherein the at least one component of the switch comprises:
   a second MAC component to process the first MAC frame upon determination by the first MAC component that the processing is to be handled at the switch.

6. The system of claim 5, wherein the at least one component of the access point further comprises:
   an antenna;
   a receive interface in communication with the antenna, the receive interface to produce the audio signal being a baseband analog radio signal; and
   an analog-to-digital converter to sample the information being a baseband analog radio signal to produce digital data; and
   a physical (PHY) component to demodulate the digital data to recover the first MAC frame for processing by either the first MAC component or the second MAC component.

7. The system of claim 1, wherein the frame containing the information transmitted over the interconnect comprises a header having an address identifying the switch and a payload including the data being the first media access control (MAC) frame included in the wireless signal.

8. The system of claim 1, wherein the at least one component of the switch is placed on a line card coupled to a communication bus of the switch.

9. The system of claim 5, wherein the switch further comprises:
   a third MAC component to receive a second MAC frame having a format in accordance with a protocol supported by the wired network, to convert the second MAC frame into a third MAC frame having a format in accordance with a protocol supported by a wireless network over which the wireless signal propagated, and to encapsulate the third MAC frame into a frame for transmission over the interconnect to the device.

10. The system of claim 9, wherein the device further comprises:
    a fourth MAC component to receive the second MAC frame and to process the second MAC frame upon determination by the third MAC component that the processing is to be handled at the device.

11. A method comprising:
    providing an access point including at least one component for wireless signal transmission and reception and for Media Access Control (MAC) processing of frames having a first predetermined type and subtype, the frames having the first predetermined type and subtype require an inflexible response time;
    providing a switch physically separated from the access point and including at least one component responsible for MAC processing of frames having a second predetermined type and subtype other than the first predetermined type and subtype, the frames having the second predetermined type and subtype allow for a more flexible response time than the response time required for the frames having the first predetermined type and subtype; and
    coupling the access point to the switch using an interconnect, the interconnect to enable the at least one component of the switch to perform MAC processing of frames having the second predetermined type and subtype that are received by the access point where the at least one component of the access point do not perform any MAC processing of the frames having the second predetermined type and subtype.

12. The method of claim 11, wherein the coupling of the access point and the switch further enables MAC frames received by the switch to undergo MAC processing of frames having a second predetermined type and subtype, the second predetermined type and subtype differing from the first predetermined type and subtype.

13. The method of claim 12 further comprising:
    coupling a wired network to the switch.

14. The method of claim 11, wherein the providing of the access point for MAC processing comprising:
    receiving a wireless signal;
    sampling a recovered analog radio signal to produce digital data;
    demodulating the digital data to recover a MAC frame; and determining the MAC frame is one of the first predetermined type and subtype.

15. The method of claim 11, wherein the at least one component of the switch is part of a removable, in-line card adapted for coupling to the switch.

16. The method of claim 15, wherein the switch is an Ethernet switch.

17. A system comprising:
an access point to detect a wireless signal, recover a media access control (MAC) frame, process the MAC frame if the MAC frame is one of a first group of predetermined types and subtypes, and encapsulate the MAC frame into a frame for transmission when the MAC frame is one of a second group of predetermined types and subtypes differing from the first group of predetermined types and subtypes;
a switch in communication with and physically separated from the access point, the switch including at least one component to receive the frame, recover the MAC frame from the frame, and process the MAC frame if the MAC frame is one of the second group of predetermined types and subtypes.

18. The apparatus of claim 17, wherein the at least one component is implemented on a line card.

19. The apparatus of claim 17, wherein the at least one component of the switch to process the MAC frame by conducting operations on the MAC frame, one of the operations includes converting the MAC frame into a MAC frame having a format supported by a wired network.

20. The apparatus of claim 17, wherein the access point to process the MAC frame by conducting operations on the MAC frame when the MAC frame is one of a Return-to-Send (RTS) frame, a Clear-to-Send (CTS) frame, and an Acknowledgement (ACK) frame.

21. The apparatus of claim 20, wherein the access point to further process the MAC frame by conducting operations on the MAC frame when the MAC frame is one of a Contention Free (CF) END frame, a CF ACK frame, a CF Poll frame, a PS-Poll frame and a Beacon.

22. The apparatus of claim 20, wherein the at least one component of the switch to process the MAC frame by conducting operations on the MAC frame when the MAC frame is one of a PROBE REQUEST frame, a PROBE RESPONSE frame, an ASSOCIATION REQUEST frame, an ASSOCIATION RESPONSE frame, a REASSOCIATION REQUEST frame, a REASSOCIATION RESPONSE frame, a DISASSOCIATION frame, an AUTHENTICATION frame, and a DEAUTHENTICATION frame.

* * * * *